United States Patent [19]

Dunaway et al.

[11] Patent Number: 4,670,993
[45] Date of Patent: Jun. 9, 1987

[54] METHOD FOR FLUIDIZING FINE KAOLIN PARTICLES

[75] Inventors: Weyman H. Dunaway; Jorge E. Salinas, both of Sandersville, Ga.

[73] Assignee: E.C.C. America Inc., Atlanta, Ga.

[21] Appl. No.: 817,158

[22] Filed: Jan. 7, 1986

Related U.S. Application Data

[63] Continuation of Ser. No. 641,481, Aug. 16, 1984, abandoned.

[51] Int. Cl.⁴ .............................................. F26B 3/08
[52] U.S. Cl. ..................... 34/10; 34/57 A; 34/82; 34/164
[58] Field of Search ............. 34/57 A, 57 R, 79, 82, 34/164, 10

[56] References Cited

U.S. PATENT DOCUMENTS

| | | | |
|---|---|---|---|
| 905,999 | 12/1908 | Emerson | 55/300 |
| 1,082,356 | 12/1913 | Newkirk | 55/300 |
| 2,840,923 | 7/1958 | Behrens | 34/164 |
| 3,161,483 | 12/1964 | Morris | 34/164 |
| 3,511,843 | 5/1970 | Lewis | 34/164 |
| 3,618,227 | 11/1971 | Breakell et al. | 34/164 |
| 3,768,174 | 10/1973 | Biaggi | 34/164 |
| 3,879,855 | 4/1975 | Weiser et al. | 34/57 R |
| 3,978,269 | 8/1976 | Martin | 428/403 |
| 4,068,389 | 1/1978 | Staffin et al. | 55/390 |
| 4,132,005 | 1/1979 | Coulaloglou | 34/10 |
| 4,235,024 | 11/1980 | Chauvin et al. | 34/164 |
| 4,304,753 | 12/1981 | Klaren | 34/57 A |
| 4,305,210 | 12/1931 | Christensen et al. | 34/164 |
| 4,320,089 | 3/1982 | Huttlin | 34/57 A |
| 4,323,312 | 4/1982 | Glatt | 34/57 D |

Primary Examiner—William E. Wayner
Assistant Examiner—David W. Westphal
Attorney, Agent, or Firm—Stefan J. Klauber

[57] ABSTRACT

A fluidized bed apparatus is provided which comprises (a) a fluidized bed container having gaseous fluidization agent intake means and discharge means; (b) gaseous fluidization agent distributor means comprising a distributor-separator plate arranged intermediate said gaseous agent intake and discharge means that is adapted to receive a mass of solid particles and substantially separate said particles from said gaseous agent intake means and has a plurality of parts therethrough spaced over substantially the entire surface thereof which have means for controlling the velocity and dispersion of a gaseous fluidization agent passing between said intake means and said discharge means; and (c) vibrating means for vibrating said container. Preferably, said container includes filter means intermediate said distributor-separator plate and said gaseous agent discharge means.

12 Claims, 1 Drawing Figure

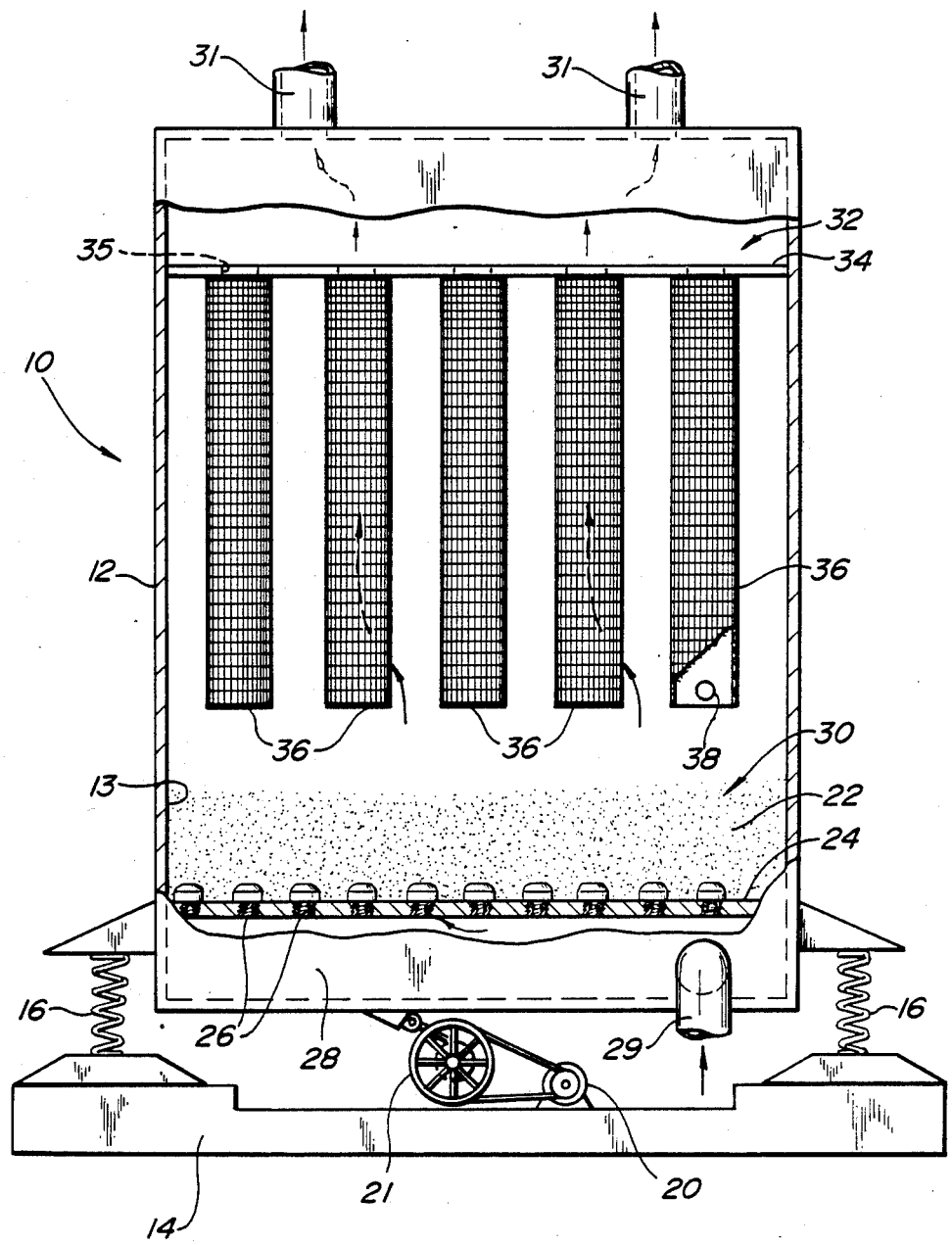

METHOD FOR FLUIDIZING FINE KAOLIN PARTICLES

This application is a continuation, of application Ser. No. 641,481, filed Aug. 16, 1984 now abandoned.

BACKGROUND OF THE INVENTION

1. Field of the Invention

The present invention relates to a fluidized bed apparatus and, more particularly, to improved fluidized bed apparatus and methods for processing of very fine particles with gases.

2. Prior Art

A variety of fluidized bed devices and technologies have been proposed and used over the years with fluid-solid systems. The fluidized bed system offers a unique combination of advantages over other types of wet and dry operating processes and applications, particularly where large quantities of solid particles are involved. Such systems are advantageously used where a great amount of heat transfer is desired, where quantities of solid particulate materials must be transported, where there is a need for optimization of chemical reactions by thorough contact between solids and gases and the like. For example, fluidized bed devices are used for solid particle treatments such as drying, coating, oxidation, firing, granulation, etc.

Fluidized bed apparatus generally consists of a chamber or enclosure within which a layer of finely divided solid particles are supported on a bed and such material is "fluidized" by gaseous fluids being passed upward through the mass of particles at a sufficient velocity. If the velocity of the gas is properly adjusted, the solid particles separate and move about in a turbulent random manner such, that the entire bed of solid particles behaves like a liquid.

Full benefit of the advantages of fluidized bed processes depends on uniform fluidization of the solid particles without agglomeration of the small particles, channeling of the gas through the bed and entrainment of particles in the gaseous fluid that is discharged. Heretofore, fluidized bed processing of very fine solid particles, such as fine kaolin clays was not feasible because such extremely fine particles have a tendency to agglomerate and large quantities of the particles become entrained in the discharging gases from which separation was difficult.

The distribution of particle sizes is also an important factor in obtaining even fluidization, the larger particles requiring different gas velocities for fluidization than smaller particles. Since fluidized bed systems must be designed for one gas velocity, very broad particle size distribution in the bed leads to a bed with stagnant large particles and entrained small particles which obviously affect the characteristics of the system and cause it to deviate from the ideal conditions which is, theoretically, attainable and desirable. Thus, materials such as kaolin, where particle sizes are dictated by nature, require prior classification and treatment to permit their processing by fluidized bed techniques.

Uniform dispersion of the gaseous fluid across the mass of particles in the bed is important for optimum performance of the apparatus. In general, this is accomplished by means of a perforated gaseous diffusion plate or construction located at the bottom of the chamber or enclosure, which also typically serves as a support means for the layer of solids to be fluidized and as a separator between the fluidized bed chamber and gas inlet chamber. The diffusion-separator is generally constructed and arranged to diffuse the gas flowing through the bed, uniformity being obtained by having sufficient pressure drop resistance through each opening in the separator and with the openings arranged to require approximately equal flow rates across the entire separator area. In addition, a suitable diffusion-separator must be constructed so as to permit little or no passage of solid particles from above the diffusion-separator into a plenum chamber where the fluidization gas enters the apparatus.

A variety of diffusion-separator configurations are known, varying from simple metallic plates having small holes drilled therethrough or specialized porous metal and ceramic plates to more involved fluidized bed structures having diffusion plates with bubble caps, perforate baffles, pipes, capillary tubes, vibratory excitation agitation means and the like.

For example, in U.S. Pat. No. 3,161,483, vibratory excitation is applied to conveyors and reactors involved in fluidized bed treatment; in U.S. Pat. No. 2,840,923, vibration generation means are applied to perforated channels used for drying materials in granular form; in U.S. Pat. No. 3,768,174, vibratory excitation of a fluidized bed device having a perforated sheet metal separator is used for drying and/or cooling fine granular products; in U.S. Pat. No. 3,511,843, vibratory means are used to agitate cohesive materials being treated with a gas to maintain the cohesive material in a fluidized state; in U.S. Pat. No. 3,618,227, vibratory means are used in the discharge hopper of a continuous drying chamber for resins to prevent blocking off the distribution of gas; in U.S. Pat. No. 4,235,024, vibratory means are used in conjunction with a gas diffusion plate of particular configuration to impart a circulatory motion to a fluidized bed of solid particles; in U.S. Pat. No. 4,305,210, vibratory means are employed to keep fluidized particles on a thin perforated corrugated diffusion plate advancing through the processing stages; and in U.S. Pat. No. 4,323,312 is disclosed a rotating disc device for directing the flow of fluidized particles in a fluidized bed apparatus.

While vibratory means used in combination with a variety of diffusion plate configurations in fluidized bed devices is suggested as a means of preventing agglomeration and channeling of gas through a bed of solid particle as well as reducing the gas velocity requirements to achieve fluidization, there still exists the problem of entrainment of very fine solid particles in the discharged gas. Further, the known systems are not flexible enough to be useful with solid particles having a wide distribution of particle sizes.

In U.S. Pat. No. 4,068,389, there is disclosed a gas diffusion plate for fluidized bed apparatus which provides improved means for regulating the gas velocity through each of the vents in the plate and for preventing solid particles from flowing back into the entrance gas plenum. While such a diffusion plate achieves an improvement in control of gas velocities over the whole fluidized bed area and in the dispersion of the fluidizing gas, it does not completely overcome the problem of agglomeration and entrainment of very small-size particles. Moreover, no means are suggested that would be flexible enough for use with solid particles having a wide particle size distribution.

As would be evident, entrainment of very finely divided particles in the discharging gas is a significant problem since recovery of the particles from the gas is important to avoid loss of material and environmental problems. However, separation of very fine solid particles from the gas is generally difficult and expensive. As disclosed, for example, in U.S. Pat. No. 3,161,483, cyclone separators are typical of the type of apparatus used to recover entrained particles from discharging fluidization gases in fluidized bed apparatus. A variety of other types of apparatus have been suggested over the years for removing solid particles entrained in flowing gases, such as disclosed, for example, in U.S. Pat. Nos. 905,999, 1,082,356 and 4,304,753. None of these, however, are concerned with fluidized bed techniques or suggest means that would be applicable in such devices.

It is apparent that the development of fluidized bed apparatus which could be effectively used with extremely finely divided solid particles such as kaolin clays would be highly desirable. It would be particularly desireable if such apparatus was flexible enough to be used with solid particles having a wide distribution of particle sizes and/or provided means for readily recovering entrained particles from discharging fluidization gases.

SUMMARY OF THE INVENTION

In accordance with the present invention, there is provided a fluidized bed apparatus which is suitable for use with very finely divided solid particles, which comprises:

(a) a fluidized bed container having gaseous fluidization agent intake means and discharge means;

(b) fluidization agent distributor means comprising a distributor-separator arranged intermediate said fluidization agent intake and discharge means adapted to receive a mass of fluidizable solid particles and substantially separate said particulate material from said gaseous agent intake means, and having a plurality of ports therethrough desirably spaced over substantially the entire surface thereof, wherein one or more of said ports and preferably each of said ports, has means for controlling the velocity and dispersion of a gaseous fluidization agent passing between said intake means and said discharge means; and (c) vibrating means for vibrating said container.

It has been discovered that a distributor-separator such as disclosed, for example, in U.S. Pat. No. 4,068,389, having means for adjusting the flow of gas through each of the ports, provides for better regulation of the dispersion of gases and the relative flow-rate vs. pressure drop through the bed of solid particles. Vibrating the fluidized bed apparatus achieves sufficient agitation of a partially fluidized bed of solid particles to significantly reduce agglomeration of extremely fine particles, such as kaolin clay, and substantially eliminates channeling that occurs in dead spots in the mass of particles. Thus, the apparatus of the present invention surprisingly and unexpectedly not only enhances the fluidization of extremely fine particles, but also provides the flexibility needed for the fluidization of solid particulate material having a wide distribution of particle sizes. Further, the apparatus of the invention which contains a distributor-separator such as disclosed in U.S. Pat. No. 4,068,389, also provides means for obstructing the flowback of solid particles into the feed gas plenum and for reducing gas-flow rate requirements.

There is also provided in accordance with the present invention fluidized bed apparatus which comprises recovery means within the fluidized bed container for solid particles entrained in the gaseous fluidization agent intermediate the fluidization agent distributor-separator means and the gaseous fluidization agent discharge means. Preferably, said recovery means for the solid particles comprises filter means. Especially advantageous are filter means such as filter bags, cannisters, and the like, having agitation means contained therein which dislodges solid particles accumulated on the surface of the filter. The apparatus of the present invention, thus, overcomes another problem associated with the fluidization of extremely finely divided solid particles by providing means for the ready separation and recovery within the fluidized bed apparatus of such particles which are entrained in the gaseous fluidization agent.

BRIEF DESCRIPTION OF THE DRAWING

FIG. 1 is a diagrammatic side elevation partially broken away of an embodiment of a basic fluidized bed apparatus of the invention.

DESCRIPTION OF THE PREFERRED EMBODIMENTS

There is shown in FIG. 1, in diagrammatic form, a fluidized bed apparatus constructed according to the present invention. The apparatus shown generally as 10 comprises a housing or container 12 that is resiliently supported from a base 14 by a plurality of springs 16, preferably coil or helical, although other types of springs, rubber blocks or other members capable of elastically supporting the weight of the vibrated housing, may be used. Means for vibrating the entire fluidized bed apparatus, such as eccentric weight vibration generating means 21, driven by a motor 20 or other means for imposing vibratory forces to the housing as known in the art, which cooperates with the springs to impart vibratory motion to the apparatus. Such means are also supported on the base 14.

The housing or container 12 of any suitable construction and configuration, such as cylindrical, round, rectangular and the like, includes a fluidization gas feed line 29 at the bottom end, and gas exhaust lines 31 extending from the top. The inner space of the housing 12 is separated into a gas intake plenum 28 at the bottom end and a fluidization chamber 22, by means of a distributor-separator plate 24. The distributor-separator plate 24 is provided with a plurality of ports 26 designed so as to permit the flow of gas therethrough and, preferably, also prevent solid particles from flowing from the fluidization chamber 22 into the gas intake plenum 28. The top of the inner space of the housing 12 is separated from the fluidization chamber 22 so as to provide an exhaust gas plenum with outlet conduits 31.

The distributor-separator plate 24 can be of various materials, and has a thickness sufficient to support a mass of particles 30 without objectionable deformation. This plate 24 is rigidly connected along its periphery to leak-tight walls 13 of the housing 12, thus forming the bottom end of the fluidization chamber 22 and the top of an air intake plenum chamber 28.

The distributor-separator plate 24 comprises a plurality of ports 26, which are desirably spaced over substantially the entire surface of the plate 24. Each of the ports 26 is provided with means for regulating the flow-rate and dispersion of gases passing upwardly through a mass of solid particles 30 supported on the plate.

In the embodiment of the invention illustrated in FIG. 1, a preferred distributor-separator plate such as disclosed in U.S. Pat. No. 4,068,389, is employed wherein one or more of the ports 26 are tapped and threaded holes in the plate 24 in each of which is inserted correspondingly threaded studs, screws and the like that form a generally helical passage for gas. Modifying the threads of the tapped holes and the threads and/or type of the corresponding studs provides means for adjusting the passage formed for the flow of gas and for regulating the dispersion of the gas passing through each of the ports, as well as providing means for blocking solid particle from flowing through the port 26 into the intake gas plenum 28.

Exhaust means for spent fluidization gases is located in the top end of the housing 12. A plate 34, having ports 35 therethrough, is connected along its periphery to the walls of the housing 12 to form the top end of the fluidization chamber 22 and provide an exhaust gas plenum 32 at the top end of the housing 12. One or more gas-solids filter means 36, such as filter bags, cartridges and the like, made of cloth, metal, etc., are secured to the exhaust gas plate 34 and extend into the fluidization chamber 22 to provide filter means for each of the exit ports 35 in the exhaust gas plate 34. Such filter means 36 serves to separate entrained solid particles from spent gases exhausting from the housing 12 through the exhaust gas plenum 32. The construction and type of material used for the filter means 36 will depend on the fluidized bed operating conditions, the type of gaseous fluidization agent, and the solid particles to be treated, and can be readily determined by routine experimentation.

In accordance with the present invention, the filter means 36 is provided with cleaning means to prevent plugging by the particles separated from the spent exhaust gases. Surprisingly, it has been discovered that the inclusion of one or more filter beaters 38, such as movable bodies in a variety of shapes which can move in all directions within each of the filter means, will achieve the desired cleaning effect. Satisfactory results can be achieved with one or more movable bodies, such as loose metal balls which are small enough to move freely within the filter means during operation of the fluidized bed apparatus, but are large enough to keep from being drawn out through the exhaust ports in the plate 34. A typical suitable filter means for a fluidized bed apparatus of the invention comprises a series of filter bags 36 secured to the plate 34, each of which contains one or more metal balls 38 as filter beaters. The filter bags 36 may be made from any suitable porous material, including porous fabrics, porous plastic cloths, etc., depending on the operating conditions to be encountered.

As would be evident to one skilled in the art, alternate embodiments of the apparatus of the invention may include, for example, means for heating or cooling either the feed or exhaust gases, baffles to direct flow of fluidized particles within the fluidization chamber 22, and any one of a number of known means for vibrating and providing flexible support for the fluidization apparatus.

In operation, a batch of solid particulate material 30, such as kaolin clay, to be treated, reacted, dried, etc., is charged to the fluidization chamber 22 to form a bed supported on the distributor-separator plate 24. The solid particles can have a wide particle size distribution, ranging from less than 2 $\mu$ to 30 $\mu$ or greater, with a material such as kaolin clay having its natural distribution of particle sizes being suitable for use. In an alternate embodiment, a continuous solids feed and discharge mode can be employed. A gaseous fluidization agent is blown into the feed gas plenum chamber 28 of the housing 12. From the feed gas plenum 28, the gas flows upward through the ports 26 of distributor-separator plate 24 and the housing 12 is vibrated by the vibrator 21 in a known manner. The particulate solids 30 fed into the apparatus 12 will then be fluidized in the fluidization chamber 22 above the distributor-separator plate 24, with the solid particles coming into intimate contact with the gaseous fluidization agent. Essentially uniform fluidization of substantially all the particles is achieved under the effects of the agitation caused by the vibrator 21, with little or no areas of non-fluidized particles being present.

The spent fluidization gas exits from the fluidization chamber 22 through the filter means 36. Thus, entrained solid particles are separated from the spent gases before being exhausted from the fluidization chamber 22 into the exhaust gas plenum 32 for discharge through exit conduits 31. Particulate solids separated from the spent gases by the filtering medium 36 are cleaned from the surface of the filter medium 36 and returned to the fluidization chamber 22 by beating action of the filter beaters 38 within each of the filters 36 under the effects of the vibrations caused by the vibrator 21.

While the present invention has been especially described in terms of specific embodiments thereof, it will be understood that numerous modifictions will be apparent to those skilled in the art without departing significantly from the spirit of invention. Accordingly, the invention is to be broadly construed and limited only by the following claims.

What is claimed is:

1. A method of treating by fluidization fine kaolin particles having a particle size distribution ranging from less than 2 $\mu$m to at least 30 $\mu$m, which comprises carrying out the fluidization within a vibratable fluidized bed container by providing a quantity of said kaolin particles atop a diffusion-separator plate having a plurality of ports, each comprising a threaded hole and a cooperating threaded means engaging the hole to provide a helical path for the flow of gas through said plate; causing the container to vibrate and simultaneously passing a fluidizing gas upwardly through said paths and into contact with said kaolin particles to fluidize same; filtering entrained particles from the gas prior to the discharge of the gas, and removing thus filtered gas from the fluidized bed container.

2. The method according to claim 1 in which filter means having filter beaters are provided, and under the influence of said vibration, particles filtered from the gas are beaten from the filter means and returned to the fluidized kaolin particles.

3. A method of treating by fluidization fine kaolin particles having a particle size distribution ranging from less than 2 $\mu$m to at least 30 $\mu$m, comprising providing a fluidized bed apparatus which comprises:

(a) a fluidized bed container having gaseous fluidization agent intake means and discharge means;

(b) gaseous fluidization agent distributor means comprising a diffusion-separator plate arranged intermediate said fluidization agent intake and discharge means adapted to receive a mass of solid kaolin particles and substantially separate said solid particles from said fluidization agent intake means and having a plurality of ports therethrough, desirably spaced over substantially the entire surface of said plate, wherein each of said ports has means for controlling the velocity and dispersion of a gaseous fluidization agent passing between said intake means and said discharge means; one or more of said ports comprising a threaded hole, threaded means individual to each of said ports, being rotably engaged with a respective one of the threaded holes for adjustment within the individual port to define with the threaded hole an adjustable helical path for the flow of gas through said plate; and (c) vibrating means for vibrating said container;

causing the container to vibrate, simultaneously passing said gas through said helical paths and into contact with a quantity of solid kaolin particles atop said diffusion-separator plate to fluidize them; and separating entrained particles from the gas and removing separated gas via said discharge means with solid particle/gas separation means intermediate said diffusion-separator plate and said gaseous fluidization agent discharge means.

4. The method according to claim 3 in which said solid particle/gas separation means comprises filter means.

5. The method according to claim 4 in which means for cleaning said filter means is provided.

6. The method according to claim 5 in which said filter cleaning means is within the filter means.

7. The method according to claim 4 in which said filter means comprises filter bags or cartridges arranged in said container to intercept all gaseous fluidization agent prior to entering said discharge means.

8. The method according to claim 7 in which said filter bags contain means for cleaning said filter.

9. The method according to claim 8 in which said filter cleaning means comprises filter beaters.

10. The method according to claim 9 in which said filter beaters comprise movable bodies within each filter bag or cartridge which can move in all directions within said filter bag or cartridge.

11. The method according to claim 3 wherein said threaded means comprises a screw, one individual to each port and each having a head and shank and a lock washer received over the shank, said washer having a plurality of circumferentially spaced resilient tongs to adjustably position and secure said head in spaced relation with the surface of said plate to define a plurality of channels beneath said head for gaseous flow in a plurality of radially and outwardly directed, substantially horizontal, gaseous streams across the surface of said plate.

12. The method according to claim 3 wherein the crests of the threads in said threaded holes are truncated.

* * * * *